(12) United States Patent
Winter et al.

(10) Patent No.: US 9,183,665 B2
(45) Date of Patent: Nov. 10, 2015

(54) FILM GRAIN FOR STEREOSCOPIC OR MULTI-VIEW IMAGES

(71) Applicant: Thomson Licensing, Issy de Moulineaux (FR)

(72) Inventors: Marco Winter, Hannover (DE); Dirk Gandolph, Hannover (DE)

(73) Assignee: Thomson Licensing, Issy les Moulineaux (FR)

(*) Notice: Subject to any disclaimer, the term of this patent is extended or adjusted under 35 U.S.C. 154(b) by 262 days.

(21) Appl. No.: 13/762,479

(22) Filed: Feb. 8, 2013

(65) Prior Publication Data

US 2013/0201186 A1 Aug. 8, 2013

(51) Int. Cl.
| | |
|---|---|
| *H04N 13/00* | (2006.01) |
| *G06T 15/04* | (2011.01) |
| *H04N 19/597* | (2014.01) |
| *H04N 19/85* | (2014.01) |

(52) U.S. Cl.
CPC ............ *G06T 15/04* (2013.01); *H04N 13/0018* (2013.01); *H04N 19/597* (2013.01); *H04N 19/85* (2013.01)

(58) Field of Classification Search
CPC .......... H04N 13/0239; H04N 13/0055; H04N 13/0242; H04N 13/0059; H04N 13/0018; H04N 19/85; H04N 19/597; G06T 7/0075; G06T 7/0022; G06T 2207/10012; G06T 19/00; G06T 17/00; G06T 15/00; G06T 5/50; G06T 15/04; G06G 5/14; G06G 2340/10
USPC ............ 348/46, 42, 51, 96, 97; 382/284, 254, 382/154; 345/419, 629, 634, 653, 664, 679
IPC ................................. H04N 13/00, 13/02, 1/043
See application file for complete search history.

(56) References Cited

U.S. PATENT DOCUMENTS

| | | | |
|---|---|---|---|
| 6,269,180 B1 | 7/2001 | Sevigny | |
| 8,319,825 B1 * | 11/2012 | Urbach | ............ 348/42 |
| 2008/0198264 A1 | 8/2008 | Balram | |

(Continued)

FOREIGN PATENT DOCUMENTS

WO WO2011142734 11/2011

OTHER PUBLICATIONS

Jachalsky et al., "Confidence evaluation for robust, fast-converging disparity map refinement", IEEE International Conference on Multimedia and Expo (ICME), Singapore, Malaysia, Jul. 19, 2010, pp. 1399-1404.

(Continued)

*Primary Examiner* — Sherrie Hsia
(74) *Attorney, Agent, or Firm* — Volpe and Koenig, P.C.

(57) ABSTRACT

A method and an apparatus for applying film grain to stereoscopic or multi-view images or sequences of stereoscopic or multi-view images are described. After retrieving an image pair or a set of multi-view images a depth map for the image pair or the set of multi-view images and a confidence map for the depth map are obtained. Film grain is then applied to non-occluded areas of the images in accordance with depth values of the depth map and confidence values of the confidence map. Occluded areas of the images are processed separately by first deriving depth values for these areas and then applying film grain to these areas in accordance with the derived depth values.

14 Claims, 2 Drawing Sheets

(56) References Cited

U.S. PATENT DOCUMENTS

2009/0102914 A1 4/2009 Collar et al.
2009/0160931 A1 6/2009 Pockett et al.

OTHER PUBLICATIONS

Dai et al, "Firm grain noise removal and synthesis in video coding", IEEE International Conference on Acoustics Speech and Signal Processing (ICASSP), Dallas, Texas, USA, Mar. 14, 2010, pp. 890-893.

Anonymous, "Interview with Sterographer Daniele Siragusano", http://www.hdhead.com/?p=279, Jun. 22, 2011, pp. 1-2.

Anonymous, "Stereoscopic Grain Issue", http://www.jahfx.com/showthread.php?30712-stereoscopic-grain-issue, Mar. 7, 2011, pp. 1-6.

Anonymous, "NewTek Announces Lightwave 3D 5.5/Film Grain Bundle", http://www.thefreelibrary.com/NewTek, Dec. 2, 1997, pp. 1-3.

* cited by examiner

FILM GRAIN FOR STEREOSCOPIC OR MULTI-VIEW IMAGES

This application claims the benefit, under 35 U.S.C. §119 of EP Patent Application 12305135.1, filed 8 Feb. 2012.

FIELD OF THE INVENTION

The present invention relates to a method and an apparatus for providing stereoscopic or multi-view images or sequences of stereoscopic or multi-view images with film grain.

BACKGROUND OF THE INVENTION

The presence of small particles of metallic silver developed from silver halide during processing of photographic film leads to a random optical texture, which is known as film grain. The amount of film grain depends, inter alia, on the film stock.

Images or image sequences obtained with digital cameras do not contain any film grain, since there is no film and hence no grains within the film. However, a number of photographers or movie directors prefer the 'old look' of analog films. Therefore, artificial film grain has sometimes been used, e.g. for HD-DVD (High Density Digital Versatile Disc). Also some image processing applications for personal computers offer the possibility to add artificial film grain to digital images.

In this regard, U.S. Pat. No. 6,269,180 describes a method for compositing images derived from cinematographic film with video images or computer generated images. Color variations due to film grain are determined for film images. A similar level of variation is applied to the video images or computer generated images. In this way it is possible to add grain to non-filmed images so as to match said images to images derived from film.

Up to now artificial film grain has mainly been used for 2D images or image sequences. However, US 2009/0102914 discloses a method for storing stereoscopic 3D video on a DVD (Digital Versatile Disc) in the form of standard video data combined with enhancement data. Film grain is removed from the enhancement data and stored as metadata on the disc. During playback the film grain is re-inserted in the enhancement data. This allows for an increased coding efficiency. No specific information is given how the film grain is re-inserted in the enhancement data, and if or how film grain is treated in the standard video data.

US 2009/0160931 describes a method for image processing that supports a stereoscopic presentation. An image processing is applied in common to the two images of a stereoscopic image pair. In order to match a visual appearance of the images for a stereoscopic presentation the two images are compared. If necessary, at least one of the images is adjusted by adjusting parameters of at least one of the image capturing components providing the images. No information is given whether this processing is also applicable to film grain in the two images.

In any case, for stereoscopic 3D or multi-view images or image sequences it has been found that film grain, be it artificial or, in case of analog film, actual film grain, often leads to a rather unpleasant viewing experience. For example, when different grain is added to the different views that are presented to a viewer, the grain is unfusable by the viewer. If the same grain is added to both views, then the viewer experiences a flat blanket of grain in the convergence plane, i.e. a wall of grain. Therefore, it is generally preferred not to add any film grain to stereoscopic or multi-view images and to remove any actual film grain by filtering. However, in an interview in the Web Portal HD HEAD it has been proposed to convert the grain in such way that it has the same depth as the object it occludes. The visual effect is that the surfaces are grainy (http://www.hdhead.com/?p=279). Unfortunately, no information is given how this can be achieved. Also, due to incomplete depth information this solution is likely to generate a rather large amount of grain artifacts.

WO 2011/142734 discloses a method for applying film grain to stereoscopic images. First film grain is added to a first view in dependence of depth values derived from a depth map. The film grain is then warped and added to the second view. Finally, holes are filled with further film grain based on the depth values for the second view.

SUMMARY OF THE INVENTION

It is an object of the present invention to propose an improved solution for providing stereoscopic or multi-view images or image sequences with artificial film grain, which yields an improved quality of the film grain.

According to the invention, this object is achieved by method for applying film grain to stereoscopic or multi-view images or sequences of stereoscopic or multi-view images, which comprises the steps of:
  retrieving an image pair or a set of multi-view images;
  retrieving a confidence map for the depth map;
  retrieving a depth map for the image pair or the set of multi-view images;
  applying film grain to non-occluded areas of the images in accordance with depth values of the depth map for areas of the depth map having a confidence equal to or higher than a specified threshold;
  applying either a weakened film grain to non-occluded areas of the images for areas of the depth map having a confidence lower than the specified threshold, or applying film grain to these areas in accordance with depth values manually specified by an operator, obtained by interpolation, or obtained from a temporal analysis of a sequence of stereoscopic or multi-view images; and
  applying film grain to occluded areas of the images in accordance with depth values manually specified by an operator, obtained by interpolation, or obtained from a temporal analysis of a sequence of stereoscopic or multi-view images.

Similarly, an apparatus for applying film grain to stereoscopic or multi-view images or sequences of stereoscopic or multi-view images comprises:
  an input or a storage medium for retrieving an image pair or a set of multi-view images;
  a depth map generator for retrieving a depth map for the image pair or the set of multi-view images and for retrieving a confidence map for the depth map; and
  a processor configured to:
  apply film grain to non-occluded areas of the images in accordance with depth values of the depth map for areas of the depth map having a confidence equal to or higher than a specified threshold;
  apply either a weakened film grain to non-occluded areas of the images for areas of the depth map having a confidence lower than the specified threshold, or applying film grain to these areas in accordance with depth values manually specified by an operator, obtained by interpolation, or obtained from a temporal analysis of a sequence of stereoscopic or multi-view images; and
  apply film grain to occluded areas of the images in accordance with depth values manually specified by an operator, obtained by interpolation, or obtained from a temporal analysis of a sequence of stereoscopic or multi-view images.

Artificial film grain is added to the different images in such way that the film grain appears coincident, i.e. on the surfaces of the different objects at different depths. The film grain thus looks correct for both eyes, as it appears in the appropriate depth. In order to apply the film grain at the correct depth, a depth map is used. The depth map is either retrieved from a storage medium or a network or generated on the fly from the image pair or the set of multi-view images. Also a confidence map is retrieved for the depth map. Similar to the depth map also the confidence map is either retrieved from the storage medium or the network or generated on the fly from the image pair or the set of multi-view images or from the depth map.

Film grain is applied to non-occluded areas of the images in accordance with depth values of the depth map only for areas of the depth map having a confidence equal to or higher than a specified threshold. An adapted film grain is applied to non-occluded areas of the images for areas of the depth map having a confidence lower than the specified threshold, e.g. a weakened film grain. It is likewise possible to apply no film grain at all to such areas.

Alternatively, it is also possible to derive depth values for the non-occluded areas of the images for which the depth map has a confidence lower than the specified threshold, as far as this is possible, or at least for parts of these areas. These depth values are, for example, obtained by interpolation, manually specified by an operator, or obtained from a temporal analysis of a sequence of stereoscopic or multi-view images. Film grain is then applied to these non-occluded areas in accordance with the derived depth values. Only to the remaining non-occluded areas or the remaining parts of the non-occluded areas for which no depth values could be derived the adapted film grain is applied.

The use of confidence maps further improves the quality of the artificial film grain, as for low confidence depth values the film grain might be applied at an incorrect depth. This would be perceived as artifacts in the images. Such artifacts are reduced by applying only an adapted film grain, which will attract less attention by the viewer.

For occluded areas there are no depth values available in the depth map. These areas are thus processed independently. The depth values for the occluded areas are manually specified by an operator or obtained from a temporal analysis of a sequence of stereoscopic or multi-view images. In case of a sequence of images it will generally be possible to derive at least some depth values from previous or subsequent images showing the same scene from a slightly different view point. Where this is not possible depth values are determined by interpolation or are manually entered by the operator. In this way reliable depth values are obtained.

The solution according to the invention thus improves the film grain perception even for difficult pixel areas.

Preferably, actual film grain, if any, is removed from the images before applying the artificial film grain, e.g. by the help of appropriate filters. Likewise, potential deficiencies of the images are favorably corrected before applying the artificial film grain. The removal of actual film grain and the correction of deficiencies will typically result in more reliable depth maps. In addition, as a correction of deficiencies is useful anyway for a pleasant viewing experience, it will generally not cause any additional processing cost.

Advantageously, a structure and/or a size of the grains of the film grain varies with the depth of the areas of the images to which the film grain is applied. For example, the size of the grains of the film grain decreases with increasing depth. In this way the depth perception of the film grain is improved, as further depth clues are made available in addition to the positioning of the film grain in depth.

Preferably, the film grain is applied to a non-occluded area of a first image by:
generating a new image from the first image by applying a disparity between the pixels of the first image and the pixels of a second image to the non-occluded pixels of the first image;
applying the same film grain to the non-occluded pixels of the new image and corresponding non-occluded pixels of the second image; and
incorporating those pixels of the new image to which film grain has been applied into the first image.

The proposed method ensures that the same film grain is applied to the different images, which is a prerequisite for achieving a correct depth perception of the film grain. Of course, it is likewise possible to apply the film grain independently to the non-occluded areas of the different images. However, in this case it needs to be ensured that the algorithm used for generating the film grain will deliver the same result in the different images.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

DETAILED DESCRIPTION OF PREFERRED EMBODIMENTS

Figure 1:
FIG. 1 shows an image without film grain and the same image with artificial film grain.

In FIG. 1 an image without film grain (left side) and the same image after application of artificial film grain (right side) are shown. As can be seen, the artificial film grain leads to a somewhat 'old-fashioned' look, as known from images taken with photographic film. Some directors prefer this look over the more 'sterile' look of images taken with a digital image sensor.

Figure 2:
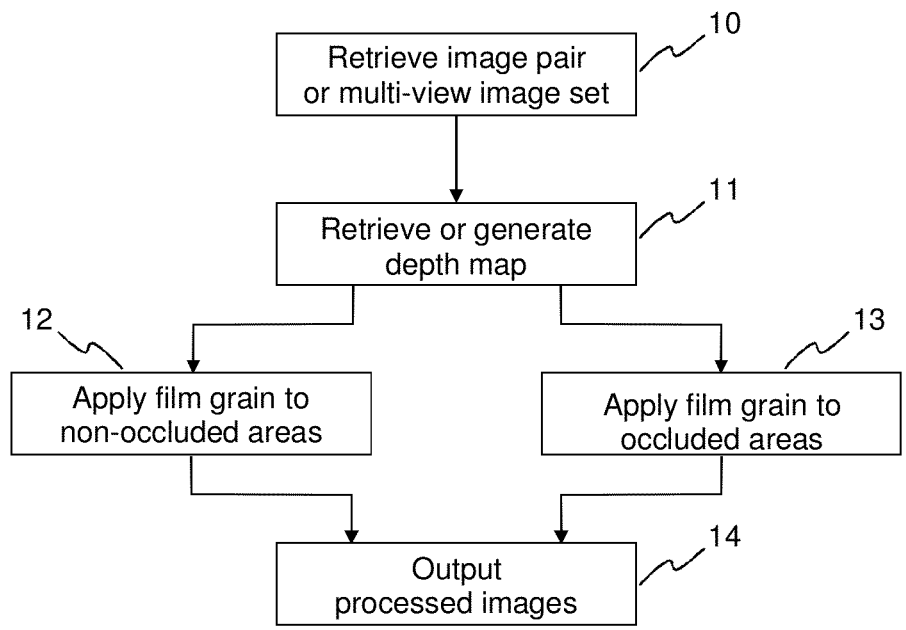
FIG. 2 schematically depicts a method according to the invention for applying film grain to stereoscopic or multi-view images or image sequences.

FIG. 2 schematically illustrates a method according to the invention for applying film grain to stereoscopic or multi-view images or image sequences. In a first step 10 an image pair or a set of multi-view images is retrieved, e.g. from a storage medium or a network. Then either a depth map is generated 11 for the images or an available depth map is retrieved. The depth map generally has at least two different types of pixel areas. The first type are those pixel positions where a reliable depth value is available. The second type are those pixel positions located within an occluded picture area, i.e. pixels which are visible only within one of the images. Once the depth map is available, the film grain is applied 12 to the pixel areas of the first type in a synchronized matter, i.e. the film grain is applied in accordance with the 3D shape as suggested by the depth map. A possible implementation of film grain application will be described below with reference to FIG. 3. An independent film grain generation is applied 13 to the occluded pixel areas of the images. For example, in case of a sequence of images a temporal analysis of the images may allow deriving depth values for the occluded pixels. Alternatively, an operator may define depth values for the occluded pixels during an image review. Finally, the processed images are output 14, e.g. to the storage medium or the network.

It is to be noted that the method assumes high quality input images without film grain. Therefore, if necessary any actual film grain is eliminated by appropriate filtering prior to processing. An exemplary filtering method is described in J. Dai et al.: "*Film grain noise removal and synthesis in video coding*", IEEE International Conference on Acoustics Speech and Signal Processing (ICASSP) 2010, pp. 890-893. Also, in case the input images exhibit deficiencies such as optical distortions or camera adjustment errors, e.g. color or geometry discrepancies, different focal planes, incorrect relative position, etc., such deficiencies are preferably corrected prior to processing. As such a correction is useful anyway for a pleasant viewing experience, it will generally not cause any processing cost. Also, corrected images will typically result in more reliable depth maps.

In addition to the depth map also a confidence map is generated or retrieved, e.g. as described in J. Jachalsky et al.: "*Confidence evaluation for robust, fast-converging disparity map refinement*", IEEE International Conference on Multimedia and Expo (ICME) 2010, pp. 1399-1404. The non-occluded pixels are then subdivided into pixels where the depth is assigned with high confidence and pixels where the depth is assigned only with a low confidence, i.e. pixels that are not marked as occluded and the depth could not be identified reliably. For the latter pixels only a weakened film grain or even no film grain is applied. Alternatively, appropriate depth values may manually be assigned to the low-confidence pixels during an image review or obtained by a temporal analysis of the images. The film grain is then applied in accordance with the assigned depth values.

Figure 3:
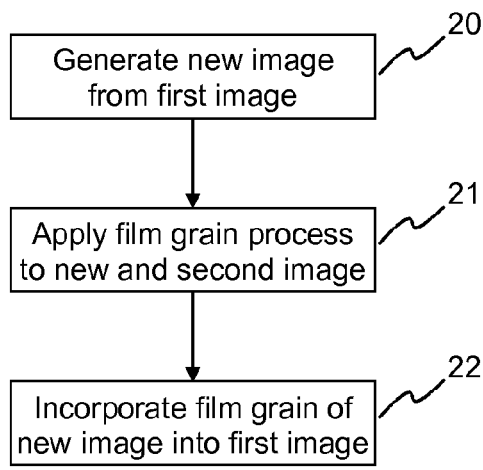
FIG. 3 illustrates an exemplary solution for applying film grain to non-occluded areas with a correct depth.

An exemplary method for applying film grain to the non-occluded areas of the images is schematically illustrated in FIG. 3. In a first step 20 a new image is generated by applying the disparity between the pixels of a first image and the pixels of a second image to those pixels of the first image for which a depth value is available, i.e. to the pixels of the first type. This results in a disparity-compensated image that looks similar to the second image. Then the same film grain process is applied 21 to both the pixels of the first type in the disparity-compensated image and the corresponding pixels of the first type in the second image. Finally, the pixels of the disparity-compensated image to which film grain has been applied are incorporated 22 into the first image by reapplying the disparity.

Preferably, for different depths the structure and/or size of the grains varies. In this way the grain may become finer for far away objects, such as objects behind the screen, and coarser for closer objects. This allows adapting the grain size to the perceived depth of the objects in the images and results in a more pleasant perception of the grain.

Figure 4:
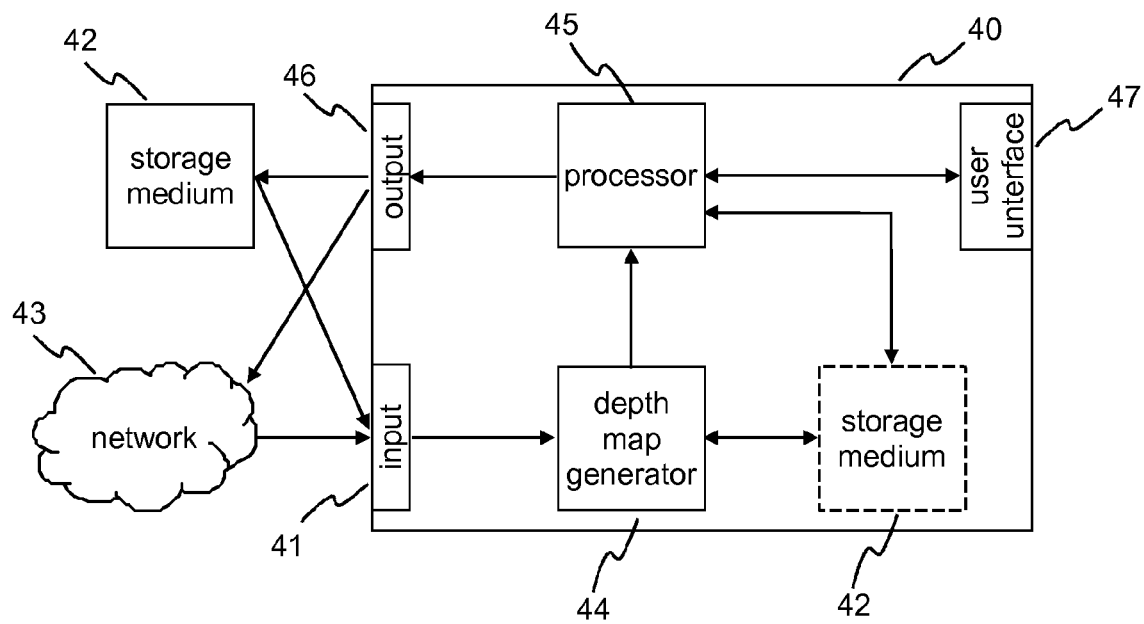
FIG. 4 schematically depicts an apparatus adapted to implement the method of FIG. 2.

An apparatus 40 adapted to implement the method according to the invention for applying film grain to stereoscopic or multi-view images or image sequences is schematically illustrated in FIG. 4. The apparatus 40 has an input 41 for retrieving an image pair or a set of multi-view images from a storage medium 42 or a network 43. Of course, the storage medium 42 may likewise be included in the apparatus 40, as indicated by the dashed rectangle. A depth map generator 44 generates a depth map from the images and confidence map for the depth map. Alternatively, a depth map and a confidence map for the depth map are retrieved via the input 41 from the storage medium 42 or the network 43, or from another source (not shown). A processor 45 applies film grain to the non-occluded pixel and the occluded pixel areas of the images based on the depth map and the confidence map. The processed images are output to the storage medium 42 or the network 43, or to another destination (not shown), via an output 46. Preferably a user interface 47 is provided, which allows a user to manually specify depth values to occluded pixel areas or to non-occluded pixel areas with a low confidence.

What is claimed is:

1. A method for applying film grain to stereoscopic or multi-view images or sequences of stereoscopic or multi-view images, the method comprising:
    retrieving an image pair or a set of multi-view images;
    retrieving a depth map for the image pair or the set of multi-view images;
    retrieving a confidence map for the depth map;
    applying film grain to non-occluded areas of the images in accordance with depth values of the depth map for areas of the depth map having a confidence equal to or higher than a specified threshold;
    applying either a weakened film grain to non-occluded areas of the images for areas of the depth map having a confidence lower than the specified threshold, or applying film grain to these areas in accordance with depth values manually specified by an operator, obtained by interpolation, or obtained from a temporal analysis of a sequence of stereoscopic or multi-view images; and
    applying film grain to occluded areas of the images in accordance with depth values manually specified by an operator, obtained by interpolation, or obtained from a temporal analysis of a sequence of stereoscopic or multi-view images.

2. The method according to claim 1, wherein the depth map is retrieved from a storage medium or a network or generated from the image pair or the set of multi-view images.

3. The method according to claim 1, wherein the confidence map is retrieved from a storage medium or a network or generated from the image pair or the set of multi-view images or from the depth map.

4. The method according to claim 1, wherein a structure or a size of the grains of the film grain varies with the depth of the areas of the images to which the film grain is applied.

5. The method according to claim 4, wherein the size of the grains of the film grain decreases with increasing depth.

6. The method according to claim 1, further comprising removing actual film grain from the images or correcting deficiencies of the images before applying film grain.

7. The method according to claim 1, wherein film grain is applied to a non-occluded area of a first image by:
    generating a new image from the first image by applying a disparity between the pixels of the first image and the pixels of a second image to the non-occluded pixels of the first image;
    applying the same film grain to the non-occluded pixels of the new image and corresponding non-occluded pixels of the second image; and
    incorporating those pixels of the new image to which film grain has been applied into the first image.

8. An apparatus for applying film grain to stereoscopic or multi-view images or sequences of stereoscopic or multi-view images, the apparatus comprising:

an input or a storage medium configured to retrieve an image pair or a set of multi-view images;

a depth map generator configured to retrieve a depth map for the image pair or the set of multi-view images and to retrieve a confidence map for the depth map; and a processor configured to:

apply film grain to non-occluded areas of the images in accordance with depth values of the depth map for areas of the depth map having a confidence equal to or higher than a specified threshold;

apply either a weakened film grain to non-occluded areas of the images for areas of the depth map having a confidence lower than the specified threshold, or applying film grain to these areas in accordance with depth values manually specified by an operator, obtained by interpolation, or obtained from a temporal analysis of a sequence of stereoscopic or multi-view images; and apply film grain to occluded areas of the images in accordance with depth values manually specified by an operator, obtained by interpolation, or obtained from a temporal analysis of a sequence of stereoscopic or multi-view images.

9. The apparatus according to claim 8, wherein the depth map generator is configured to retrieve the depth map from a storage medium or a network or to generate the depth map from the image pair or the set of multi-view images.

10. The apparatus according to claim 8, wherein the depth map generator is configured to retrieve the confidence map from a storage medium or a network or to generate the confidence map from the image pair or the set of multi-view images or from the depth map.

11. The apparatus according to claim 8, wherein the processor is configured to vary a structure or a size of the grains of the film grain with the depth of the areas of the images to which the film grain is applied.

12. The apparatus according to claim 11, wherein the processor is configured to vary the size of the grains of the film grain such that the size decreases with increasing depth.

13. The apparatus according to claim 8, wherein the processor is configured to remove actual film grain from the images or to correct deficiencies of the images before applying film grain.

14. The apparatus according to claim 8, wherein the processor is configured to apply film grain to a non-occluded area of a first image by:

generating a new image from the first image by applying a disparity between the pixels of the first image and the pixels of a second image to the non-occluded pixels of the first image;

applying the same film grain to the non-occluded pixels of the new image and corresponding non-occluded pixels of the second image; and incorporating those pixels of the new image to which film grain has been applied into the first image.

\* \* \* \* \*